United States Patent [19]

McCrary et al.

[11] 4,111,245
[45] Sep. 5, 1978

[54] TREE DELIMBER

[75] Inventors: Carl M. McCrary, Kalama; Robert D. Larsen, Kelso, both of Wash.

[73] Assignee: Weyerhaeuser Company, Tacoma, Wash.; by said Carl M. McCrary

[21] Appl. No.: 754,058

[22] Filed: Dec. 23, 1976

[51] Int. Cl.² .............................................. B27L 1/00
[52] U.S. Cl. ................................ 144/2 Z; 144/2 AA; 241/101.7
[58] Field of Search ............ 144/2 Z, 2 AA, 309 AC; 241/101.7

[56] References Cited

U.S. PATENT DOCUMENTS

| 3,863,848 | 2/1975 | Nashuda | 241/101.7 |
| 3,868,981 | 3/1975 | Nadeau | 144/2 Z |

FOREIGN PATENT DOCUMENTS 424,706 11/1971 U.S.S.R. ............................ 144/2 AA

Primary Examiner—Othell M. Simpson
Assistant Examiner—W. D. Bray

[57] ABSTRACT

An apparatus for delimbing felled trees is described, wherein the trees are pulled individually or, in some cases, in bundles through the delimber. The delimber is provided with a base; a lower impact shear blade which is a notched steel plate supported upon the base, the notch bounding the under half circumference of a tree in the delimber; upper impact shear blades which are a pair of arcuate arms pivoted on the base, designed and arranged such that a tree resting in the notched plate is bound substantially about its upper half circumference by the arcuate arms pivoted into contact with the tree; and an activating plate, pivoted upon the base, interconnected with the arcuate arms such that the weight and force of a tree pulled through the delimber in contact with the notched plate, acts upon the activating plate causing it to pivot thereby pulling the arms into contact with the tree. Additionally, a biasing system is described which maintains the arcuate arms in an open position for receiving a tree to be delimbed, which system causes the arcuate arms to remain pivoted outboard the delimber center line whenever there is no tree acting upon the activating plate.

5 Claims, 5 Drawing Figures

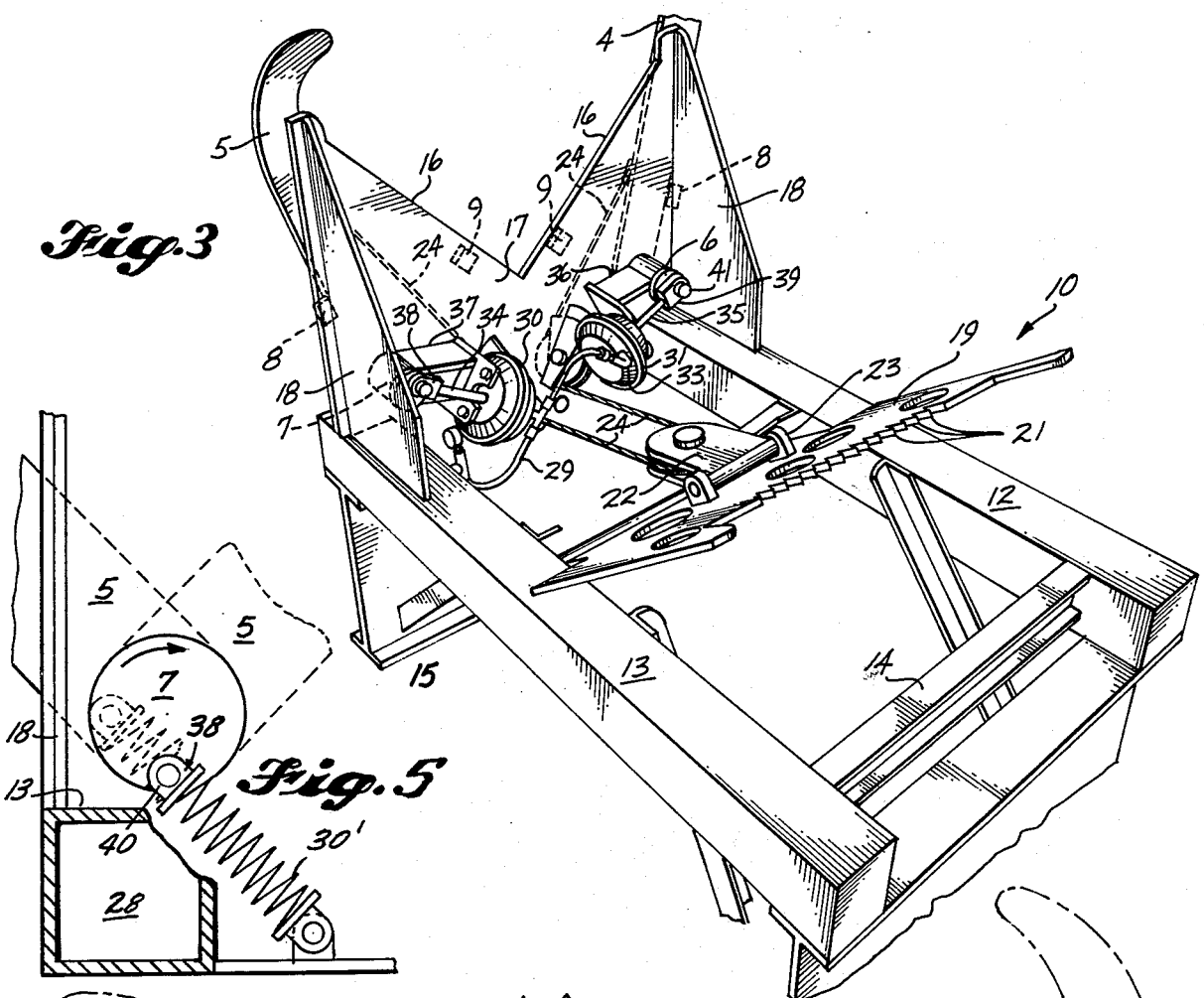
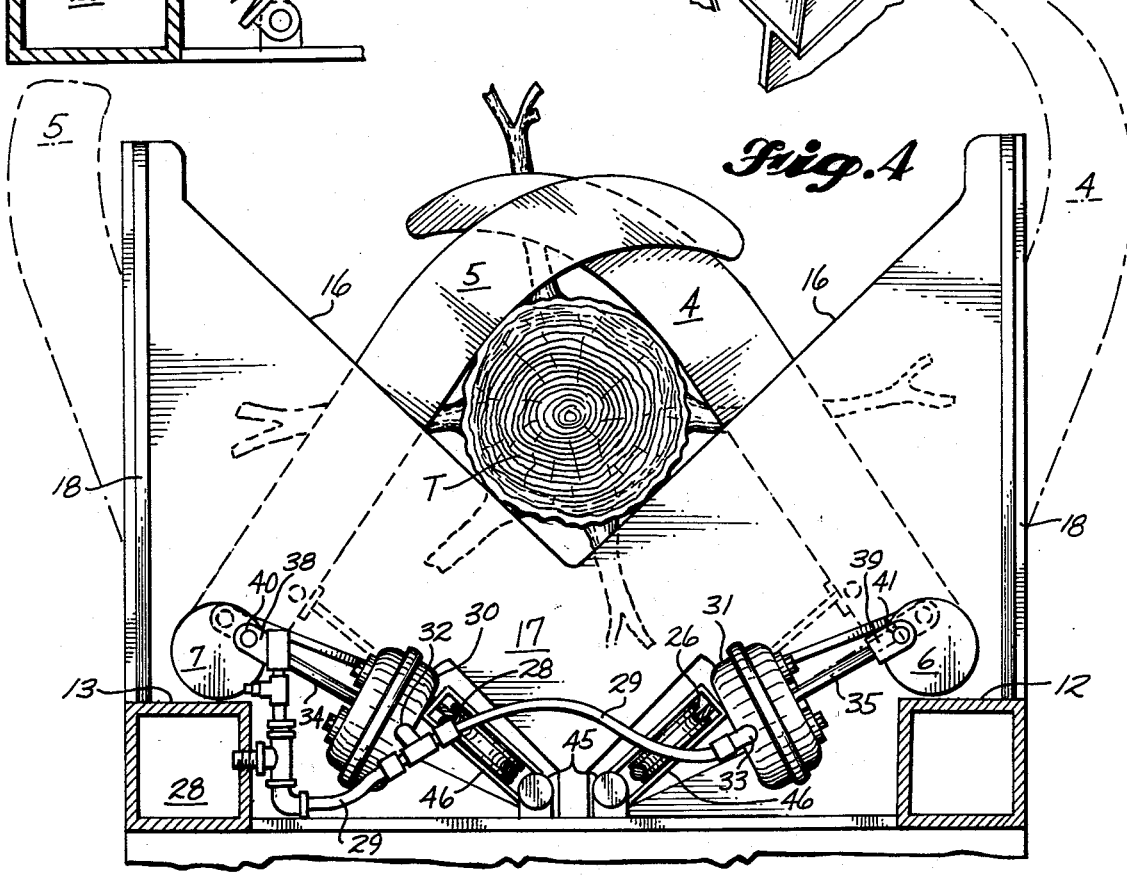

TREE DELIMBER

BACKGROUND OF THE INVENTION

This invention relates to apparatus for delimbing felled trees. More particularly, the delimbing apparatus of interest removes limbs by impact shearing as a tree is pulled horizontally through the apparatus.

Many of the tree delimbers shown in the art are designed to handle large trees and are, therefore, of heavy construction and relatively mechanically complex. Other delimbers, of lighter construction but of no less complexity, are designed as articulated attachments to a skidder or bucket loader, usually in combination with a set of shear blades for severing the tree. Characteristic of both types of delimbers are a pair of arcuate arms that enclose the outer portion, with respect to the delimber, of the tree and hold the tree into contact with a set of secondary blades that encloses the under portion of the tree. The arcuate arms are typically engaged by a hydraulic jack system actuated from the cab of the prime mover. Secondary blades are often flexible and spring supported. These are engaged as the arms pull the tree into contact with the delimber frame. Typical delimbers of the type discussed above are shown in Moser, U.S. Pat. No. 3,842,872 and in McCabe U.S. Pat. No. 3,809,134.

To simplify or eliminate the relatively complex hydraulic systems typically used to urge the arcuate arm blades into contact with a tree, various approaches utilizing the weight of the blade or tree to ensure adequate blade-tree contact have been tried. For example, in Jouppi, U.S. Pat. No. 3,881,532, a tree, as it is pulled horizontally through the delimber, contacts a depresser plate which, acting through a rod, lever and pulley system, releases a safety catch and activates a pusher bar causing a mast, upon which is mounted a flexible upper blade, to pivot downward and contact the upper half circumference of the tree. The weight of the blade system ensures that the blade remains in contact with the tree as it is pulled through the delimber. A separate mechanism is provided to raise the mast-blade system after the tree is pulled free of the delimber. In Nadeau, U.S. Pat. No. 3,868,981, an upper blade and a lower blade are interconnected through a rigid arm such that the weight of a tree as it is pulled horizontally through the delimber, contacting the lower blade, is transmitted to the upper blade causing the upper blade to engage the tree. The weight of the tree ensures that both blades are in continual engagement until the tree is pulled free of the apparatus.

SUMMARY OF THE INVENTION

The present invention is a simplified tree delimber which removes limbs from felled trees by impact shearing as a tree or, in the case of some species, a bundle of small diameter trees, is pulled horizontally through the apparatus. The tree delimber apparatus basically comprises a base upon which is mounted a lower impact shear blade fixed to the base; and upper impact shear blades comprising a pair of arcuate arms, pivoted upon the base, wherein the arcuate arms are activated by the weight of the tree acting upon an activating plate interconnecting the arms and plate. The lower blade is preferably a rectangular-edged notch cut into a steel plate vertically mounted upon the base, for contacting the under portion of the horizontal tree. The upper impact shear blades are, preferably, a pair of arcuate arms, the lower ends of which are pivoted upon the base, spaced apart laterally to accommodate the tree diameter within the arms, in line with but displaced axially from the lower impact blade, wherein the relationship between upper and lower impact blades is such that a tree in contact with both blades is substantially completely encircled by them. The activating plate is pivoted on the base, displaced axially from the upper and lower impact blades. A means for interconnecting the activating plate with the upper arcuate impact blades is provided so that a tree contacting the activating plate causes the plate to pivot in the direction of movement of the tree. Through the interconnecting means, the activating plate causes the upper arcuate blades to pivot into encircling contact with the upper portion of the tree. As the tree is pulled through the delimbing device, its weight continues to pull against the activating plate, ensuring that the upper arcuate blades shear limbs from the upper portion of the tree while holding the tree into contact with the lower blade so that limbs from the under portion of the tree are removed.

An advantage of the new apparatus, in utilizing the weight of the tree to ensure contact with the shearing blades, is that it may be made of relatively light construction and is thus more highly mobile than delimbers shown in the art. The tree delimber can be used to delimb small lightweight trees, an important advantage as the average size of trees logged declines in the future.

A further object of the present invention is to provide a tree delimber of such simple design and low cost that it can be acquired and utilized by small logging operators. The lightweight construction is an advantage to small operators in that the apparatus may be readily moved from site to site without the utilization of expensive heavy equipment.

An improvement to the instant delimber comprises the addition of a system for biasing the arcuate arms in an open position whenever the tree delimber is not in use so that it is always in a position to receive the next tree to be delimbed. The preferred biasing system utilizes a pair of air actuaters, each actuater fixed to the base, having a connecting rod attached at one end to an arcuate arm with the other end of the rod responsive to an air pressure force acting upon the rod of sufficient strength to ensure that the arcuate arms are pivoted into the open position whenever there is no tree in the delimber depressing the actuating plate and causing the arcuate arms to close to the delimbing position.

BRIEF DESCRIPTION OF THE DRAWINGS

The following drawings are of a preferred embodiment of the delimber apparatus invention.

FIG. 3 is a perspective showing detail of the air biasing system.

FIG. 4 is a rear section view showing the air biasing system.

FIG. 5 shows the biasing system utilizing springs.

DETAILED DESCRIPTION OF THE PREFERRED EMBODIMENT

Figure 1:
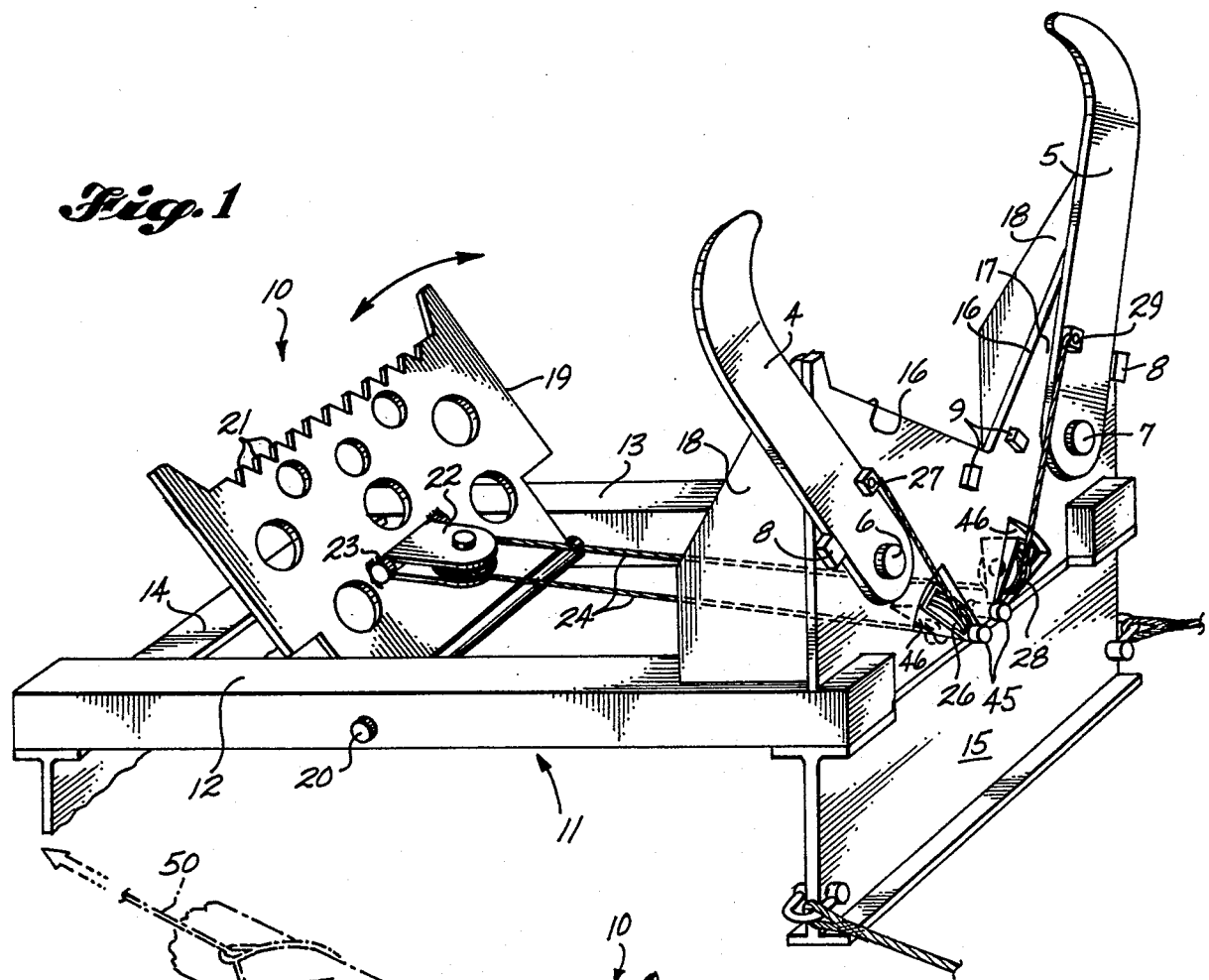
FIG. 1 is a perspective view of the preferred delimber.

FIG. 1 is a perspective view of the preferred delimber apparatus 10. The base 11 of the tree delimber comprises rectangular beam 12 and rectangular beam 13 interconnected with sufficient supporting cross members 14, 15 necessary to form a rigid, rectangular base.

The base 11 may be supported above the ground surface by extending cross members 14, 15 to form a sub-base which may be anchored to the ground. A lower impact shear blade is formed by notch 16 which is cut into a flat, substantially vertical plate 17 rigidly fixed to base 11 with sufficient bracing web members 18 to ensure structural integrity capable of resisting tree delimbing forces applied to the apparatus. The lower impact notch blade 16 is dimensioned and angled to provide as much contact as possible with the under portion of an average sized trees intended to be delimbed.

Upper impact shear blades are comprised of arcuate arm 4 and arcuate arm 5 pivotally mounted on plate 17 at pivot 6 and pivot 7, respectively. The pivots 6, 7, not shown in detail, may comprise a short journal shaft attached perpendicularly to the arms 4, 5, which shaft is mounted in a journal bearing surface fixed to plate 17 thereby allowing arms 4, 5 to rotate freely about the journal shaft axis. The arcuate arms 4, 5 are then free to rotate about the axis of their respective journals between stops 8, 9, mounted on plate 17, being in fully open position when arms 4, 5 are in contact with the outer stops 8 and in the fully closed position, in the absence of a tree, with the arms 4, 5 against inner stops 9. The arcuate arms 4, 5 are in line but slightly displaced axially. The relationship between the upper arcuate blades 4, 5 and lower impact blade 16 is such that a tree in contact with both blades is substantially completely encircled by the combined delimber blades 4, 5 and 16.

An activating plate 19 is pivotably mounted between base members 12 and 13 by pin 20. The activating plate 19 is displaced axially along the center line of the delimber base 11 from the upper and lower impact blades. The activating plate 19 is free to pivot about pin 20 in a direction parallel to the axis of the base 11.

The activating plate 19 has a serrated blade 21 which contacts the tree as it is pulled through the tree delimber apparatus. A cable 24 interconnects the activating plate 19 with each one of the arcuate arms 4 and 5. Cable 24 passes through pulley 22 mounted on activating plate 19 at pivot 23. One end of cable 24 passes around pulley 26, which is pivotally attached to base 11, at the point where the cable passes through plate 17, and is fixed to arm 4 at fastening device 27, while the other end of cable 24 passes through plate 17 about pulley 28 and is fixed to arm 5 at fastening device 29. The length of cable 24 must be sized so that it is long enough to allow the arcuate arms to assume the fully opened position against stops 8. Also, the length must be such that when there is pressure on plate 19 caused by a sizable tree in the apparatus, only pressure sufficient to firmly grip the tree is transmitted to the arms so that the arms do not significantly damage the surface of the tree. The plate 17 is cut away at 46 near pulleys 28 and 26 to allow pivoting movement about pins 45 as necessary to accommodate arm rotation.

A system for biasing the arcuate arms in a fully opened position with the arms abutting the outer stops 8 is shown in FIGS. 3-4. Mounted on the inside of vertical plate 17 at mounting brackets 36, 37 are two air-pressure activated positioners 30, 31. An air reservoir 28, which may be contained in base supporting member 13, provides air through lines 29 to the positioner diaphragms, not shown in detail, through fittings 32, 33. Positioner rods 34, 35, which respond to diaphragm displacement, are connected through connector brackets 38, 39 to the journal shaft 6, 7 of the arcuate arms 4, 5 by studs 40, 41 which are fixed to respective shafts 6, 7, offset from the center line of the shafts.

Thus in operation, the reservoir 28 is pressurized with air so that the pressure on the diaphragm side 32, 33 of the air positioners 30, 31 is sufficient to displace positioner rods 33, 35 to their extended position, causing, through brackets 38, 39, the angular displacement of studs 40, 41 which are offset on shafts 6, 7 such that the shafts 6, 7 rotate outboard to the delimber until the arms 4 and 5 contact stops 8 mounted on plate 17. The arms remain biased in this open position as long as there is no force other than the weight of the arms and activating plate 19 operating upon the system.

Figure 2:
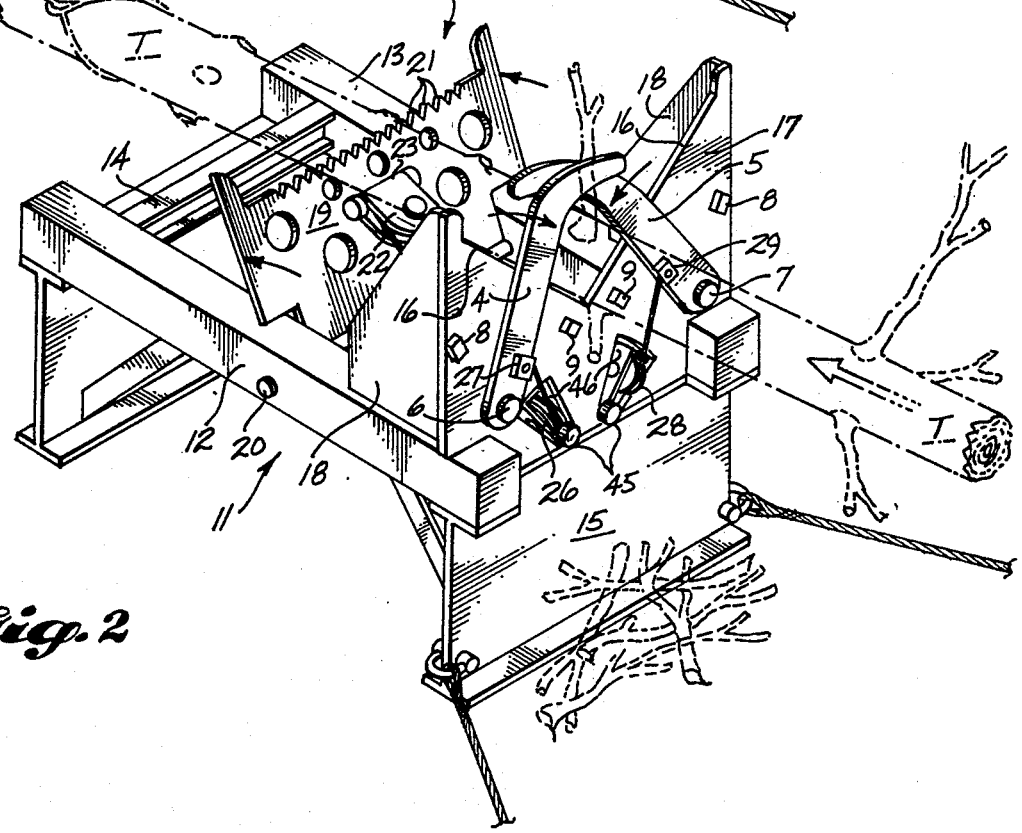
FIG. 2 shows the delimber operating upon a tree.

With the arcuate arms 4, 5 in the open position, the tree delimber apparatus 10 is ready to receive a tree. The base or butt end of the tree T to be delimbed is placed in lower impact notch blade 16. As shown in FIG. 2, a cable 50, or grapple, is attached near the base of the tree and connected to a skidder which then begins to pull the tree through the delimber. As the base of the tree contacts the activating plate 19, the weight of the tree and a portion of the pulling force causes the plate to pivot in the direction of the moving tree. The serrated teeth 21 help hold the tree parallel to the center line of the delimber as the tree is pulled through. The pivoting of the blade 19 causes a pulling force to be transmitted from the plate through the cable 24 around pulleys 26, 28 to the cable stops 27, 29 located upon arcuate arms 4, 5. The pulling force on the cable cause the arms to rotate from the open position until they firmly encompass the upper portion of the tree. The cable 24 is sized so that the smallest diameter upper half-circumferential portion of the contemplated tree is enclosed by the arms but is of sufficient length so that when larger diameter upper half-circumferential portions of a tree are enclosed, neither the breaking limit of the cable is exceeded nor serious surface damage to the tree occurs.

With the tree substantially encircled by the lower impact shear blade in the form of the notch blade 16 and the arcuate arms 4, 5, the tree is pulled through the delimber. As limbs reach the blade they are sheared from the tree by the impact and cutting action of the blades. The delimbed tree is pulled clear of the delimber and moved to a temporary storage area. As the delimbed tree clears the activating plate 19, the air biasing system 30, 31 causes the arcuate arms to return to the fully open position against stops 8, ready for the next tree. Occasionally the sheared limbs must be removed from the area of the delimber.

The tree delimber is preferably made of plate steel which may be welded or otherwise joined together. The apparatus may be dimensioned to accommodate any size tree. A sub-base may be added to the tree delimber to elevate the apparatus from the ground as desired and provide anchoring points to keep the delimber from moving during operation.

It is contemplated that some variation in blade design may be made. For example, the notched plate lower impact shear blade may be appropriately hardened and reinforced to improve shearing effectiveness. The shape of the notched blade or the arcuate arms may be modified to better accommodate and encircle an average size tree, especially where an operator is cutting in even-age stands of trees.

The prime mover for pulling the trees through the delimber may be any type of skidder, bulldozer, or loader capable of handling the weight of the trees to be delimbed. The preferred prime mover is a skidder with a grapple device which can grasp the tree, lift it into the delimber, and pull it through. The grapple device is also useful for cleaning sheared limbs from the blade area.

Where small diameter trees are being cut, an individual tree, which may be only 4 inches in diameter at the butt end, may not have sufficient weight to properly activate the delimber. Under these circumstances some species of trees may be bundled together and successfully delimbed with the instant delimber. Bundling is especially successful with Douglas fir, but less so with cedar or hemlock. Where a tree, such as cedar, cannot be bundled and is too light to operate the delimber, a downward force on the cable pulling the tree through the delimber will exert enough pressure upon the activating plate to successfully delimb the light trees. The grapple-skidder is most useful with respect to this operation as the boom may readily be dropped close to the ground, exerting the necessary downward force on the cable.

The biasing system described to maintain the delimber arcuate arms in the ready or open position is shown using a pair of air pressure activated positioners. Of course, other similar tensioning devices, such as springs or torsion bar systems, are the equivalent of the preferred operators.

FIG. 5 shows one half of a pair of spring biasing means wherein a tensioned spring is substituted for the air activator positioner 30, 31 to accomplish biasing the delimber in the open position.

While the preferred embodiment shows the arcuate arms mounted on the notched plate forming the lower impact shear blade, it is contemplated that the arcuate arms could be otherwise supported on the base and somewhat displaced axially from the lower cutting blade and/or each other. Other modifications and alterations to the basic tree delimber design of the invention will be obvious to those skilled in the art.

What is claimed is:

1. A tree delimber for delimbing trees pulled substantially horizontally through the delimber, comprising:
   a base;
   a lower impact shear blade, comprising a notched plate such that a tree resting in the notch is substantially bounded about its lower half circumference by the notch, said plate fixed to the base substantially vertically and transverse to the travel of the tree through the delimber;
   upper impact shear blades, comprising a pair of arcuate arms pivotally mounted upon said base, arranged wherein a tree resting in the lower shear blade is substantially bounded about its upper half circumference by the pair of arms pivoted into contact with said tree;
   an activating plate pivotally fixed to the base, axially displaced from said upper and lower blades, said activating plate arranged such that the travel of the tree through the delimber contacts said plate causing it to pivot in response to said tree; and
   a means for interconnecting the activating plate with said upper impact shear blades, wherein a tree contacting said lower blade and activating plate causes the upper blade arcuate arms to pivot into bounding contact with the upper half circumference of the tree.

2. The apparatus of claim 2 wherein said arcuate arms are pivotally journaled to said notched plate and spaced apart such that a tree contacting both notch and arms is substantially encompassed by the combined arms and notch.

3. The apparatus of claim 1 including a system for biasing the arcuate arms in an open position ready to receive a tree to be delimbed wherein each arm is pivoted outward from the center line of the delimber, comprising:
   a biasing means, fixed to the base, for forcing the arcuate arms to rotate about their pivots;
   a means for interconnecting the biasing means to each arcuate arm; and
   a pair of stops fixed to the base for limiting the outward rotation of said arms,
   the biasing means providing sufficient force to cause the arms to rotate outboard the delimber center line whenever there is no tree contacting the activating plate but which force is overcome by a tree contacting said activating plate resulting in said arms rotating into contact with the tree circumference.

4. The apparatus of claim 3 wherein the biasing means is a pair of air pressure activated actuators provided with sufficient air pressure to rotate the arms outwardly.

5. The apparatus of claim 3 wherein the biasing means is a pair of springs having sufficient tensioning capacity to rotate the arms outwardly.

* * * * *

UNITED STATES PATENT AND TRADEMARK OFFICE
CERTIFICATE OF CORRECTION

PATENT NO. : 4,111,245
DATED : September 5, 1978
INVENTOR(S) : Carl M. McCrary and Robert D. Larsen It is certified that error appears in the above-identified patent and that said Letters Patent are hereby corrected as shown below:

In claim 2, line 1, "claim 2" should read --claim 1--.

Signed and Sealed this

Sixth Day of March 1979

[SEAL]

Attest:

RUTH C. MASON
Attesting Officer

DONALD W. BANNER
Commissioner of Patents and Trademarks